US006876862B1

(12) United States Patent
Tanaka (10) Patent No.: US 6,876,862 B1
(45) Date of Patent: Apr. 5, 2005

(54) PHONE NUMBER TRANSMISSION BETWEEN TELEPHONE DEVICES (75) Inventor: Motoshi Tanaka, Kanagawa (JP)

(73) Assignee: NEC Corporation, Tokyo (JP)

( * ) Notice: Subject to any disclaimer, the term of this patent is extended or adjusted under 35 U.S.C. 154(b) by 536 days.

(21) Appl. No.: 09/679,969

(22) Filed: Oct. 5, 2000

(30) Foreign Application Priority Data

Oct. 6, 1999 (JP) .......................................... 11/285631

(51) Int. Cl.[7] .............................................. H04Q 7/20
(52) U.S. Cl. .................... 455/466; 455/412.1; 455/460; 455/564
(58) Field of Search ................................ 455/460–461, 455/466, 517, 563–567, 575, 90, 415, 412.1, 412.2, 403, 458; 379/67.1, 88.16, 304, 354

(56) References Cited

U.S. PATENT DOCUMENTS

| 5,488,649 | A | * | 1/1996 | Schellinger ................. 455/411 |
| 5,781,860 | A | * | 7/1998 | Lopponen et al. ........ 455/426.1 |
| 5,940,471 | A | * | 8/1999 | Homayoun .............. 379/10.03 |
| 5,943,611 | A | * | 8/1999 | Molne ........................ 455/564 |
| 5,956,632 | A | * | 9/1999 | Shon ........................ 455/404.1 |
| 6,032,053 | A | * | 2/2000 | Schroeder et al. ........ 455/553.1 |
| 6,236,867 | B1 | * | 5/2001 | Todo et al. .................. 455/563 |
| 6,307,922 | B1 | * | 10/2001 | Scherer .................... 379/91.02 |
| 6,320,943 | B1 | * | 11/2001 | Borland .................. 379/112.01 |
| 6,327,482 | B1 | * | 12/2001 | Miyashita ................... 455/566 |
| 6,351,637 | B1 | * | 2/2002 | Lee ............................ 455/415 |

FOREIGN PATENT DOCUMENTS

| JP | 59-228454 | | 12/1984 | |
| JP | 592284854 A | * | 12/1984 | .......... H04M/1/274 |
| JP | 61-224645 | | 10/1986 | |
| JP | 61224645 A | * | 10/1986 | ............ H04M/1/57 |
| JP | 2-32654 | | 2/1990 | |
| JP | 02032654 A | * | 2/1990 | ............ H04M/1/26 |
| JP | 5-91057 | | 12/1993 | |
| JP | 09233215 A | * | 9/1997 | .......... H04M/11/00 |
| JP | 9-233215 | | 9/1997 | |
| JP | 9-284379 | | 10/1997 | |
| JP | 09284379 A | * | 10/1997 | .......... H04M/1/274 |
| JP | 10-173756 | | 6/1998 | |
| JP | 10173756 A | * | 6/1998 | .......... H04M/1/274 |

OTHER PUBLICATIONS

Japanese Office Action dated Oct. 1, 2002 (w/ English Translation).

* cited by examiner

Primary Examiner—Pablo N. Tran
(74) Attorney, Agent, or Firm—Dickstein, Shapiro, Morin & Oshinsky, LLP.

(57) ABSTRACT

A telephone apparatus allowing easy and reliable phone number transfer to the other party through an established connection now used for telephone conversation is disclosed. A desired phone number can be automatically transmitted to the other party, and the other party automatically receives and stores the desired phone number without human errors. At a receiving side, the correct phone number can be easily registered in a memory or a phone directory memory so as to make a call at the phone number.

16 Claims, 8 Drawing Sheets

PHONE NUMBER TRANSMISSION BETWEEN TELEPHONE DEVICES

BACKGROUND OF THE INVENTION

1. Field of the Invention

The present invention generally relates to a telephone device, and in particular to a technique of data communication between telephone devices.

2. Description of the Related Art

There has been disclosed a multi-function telephone device allowing a desired phone number to be called up to a display screen even in conversation with the other party in Japanese Patent Application Unexamined Publication No. 59-228454. In phone conversation, it is of frequent occurrence that one party asks the other about the phone number of a third party. In such a case, it is very convenient to call up a desired phone number from a phone directory memory while maintaining the telephone line.

On the other hand, a telephone device allowing a phone number to be input by the user even in conversation with the other party has been disclosed in Japanese Utility-model Application Unexamined Publication No. 5-91057. This telephone device further allows a calling operation using a phone number registered in a phone directory memory. Therefore, after registering the phone number of a third party heard from the other party, the user can easily make a call at the phone number of the third party by calling up it from the phone directory memory.

In the case of the above-described conventional telephones, however, the user is likely to input erroneous phone numbers in the phone directory memory, resulting in frequently dialing a wrong number.

SUMMARY OF THE INVENTION

An object of the present invention is to provide a telephone apparatus and a data communication method that can easily transfer a correct phone number from one party to the other party in communication with the other party.

Another object of the present invention is to provide a telephone apparatus that can easily register a correct phone number in a memory and make a call at the correct phone number.

According to the present invention, a telephone apparatus includes: a transceiver; a display device; an input device for inputting data and desired instructions; a memory for storing received data; and a control device controlling such that, when a telephone call is in progress through an established connection to another party and a predetermined kind of distinguishable data is received from the other party through the established connection, the received distinguishable data is stored into the memory so as to allow it to be reused.

The controller may further control such that, when the telephone call is in progress through the established connection to the other party, the predetermined kind of distinguishable data is transmitted to the other party through the established connection depending on an instruction inputted through the input device.

A telephone apparatus includes: a transceiver; a display device; an input device for inputting phone number data and desired instructions; a memory for storing received data; and a control device controlling such that, in communication with another party through an established connection, when receiving phone number data from the other party through the established connection, the received phone number data is automatically stored into the memory and is displayed on the display device.

The received phone number data stored in the memory may be used to make a call depending on an instruction inputted through the input device.

The controller may further control such that, when the telephone call is in progress through the established connection to the other party, desired phone number data is transmitted to the other party through the established connection depending on an instruction inputted through the input device.

The desired phone number data may be produced through the input device.

The telephone apparatus may further include a phone directory memory for retrievably storing a plurality of phone numbers. The desired phone number data may be retrieved from the phone directory memory depending on an instruction inputted through the input device. The received phone number data stored in the memory may be transferred to the phone directory memory depending on an instruction inputted through the input device.

The telephone apparatus may further include a speech recognizer for recognizing input voice data to produce character data. The desired phone number data may be produced by the speech recognizer receiving voice data corresponding to digits of the desired phone number through a microphone of the telephone apparatus.

According to another aspect of the present invention, a method for transferring a phone number from a first telephone to a second telephone, which are in communication through a connection, includes the steps of: the first telephone produces transmission data including a desired phone number to be transmitted, and transmits the transmission data to the second telephone through the connection; and the second telephone receives the desired phone number included in the transmission data from the first telephone through the connection, displays the desired phone number received, and stores the desired phone number received into a memory.

As described above, a desired phone number can be transmitted to the other party through an established connection now used for telephone conversation, and the other party automatically receives and stores the desired phone number. Accordingly, a desired phone number can be transferred from one party to the other party without human errors.

Further, at a receiving side, the correct phone number can be easily registered in a memory or a phone directory memory so as to make a call at the phone number.

Furthermore, a desired phone number can be entered by using a speech recognizer for voice input or a phone directory memory, resulting in more effectively avoiding human errors.

DETAILED DESCRIPTION OF THE PREFERRED EMBODIMENTS

First Embodiment

Figure 1:
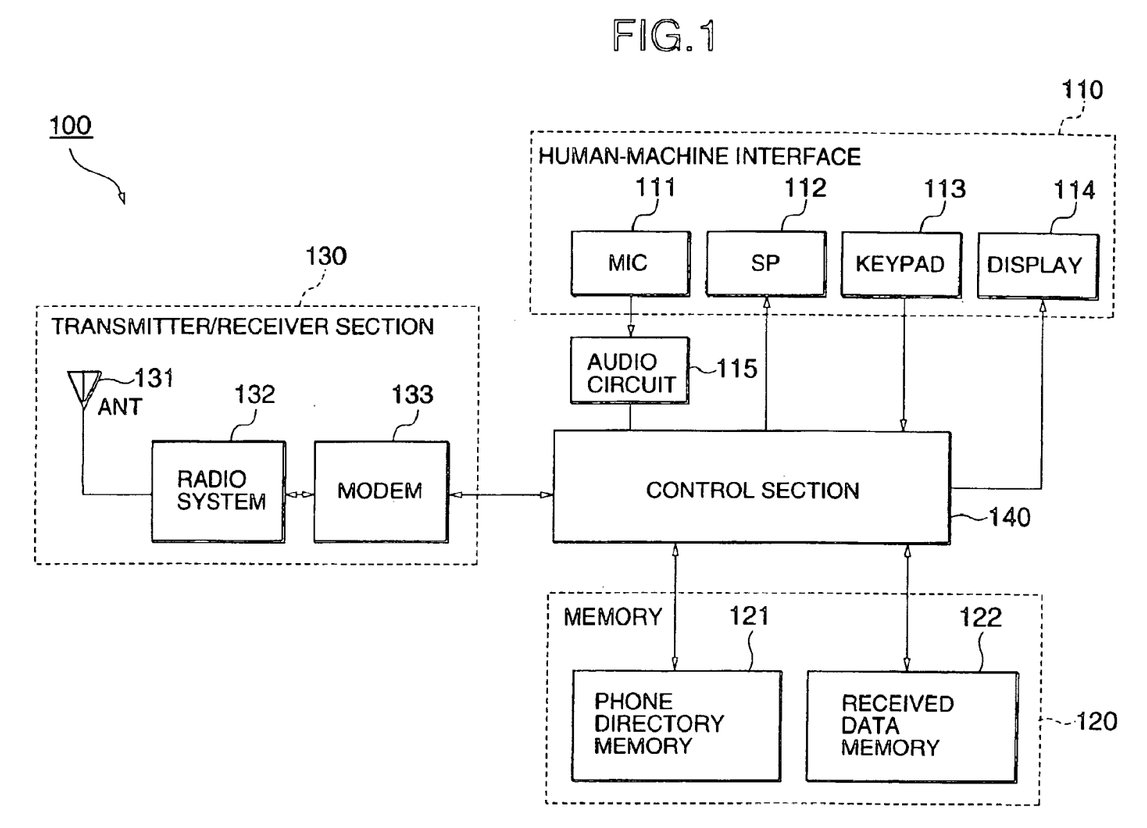
FIG. 1 is a block diagram showing a radio mobile telephone according to a first embodiment of the present invention.

Referring to FIG. 1, there is shown a mobile telephone 100 in accordance with a first embodiment of the present invention. The mobile telephone is composed mainly of a human-machine interface 110, a memory 120, a transmitter/receiver section 130, and a control section 140.

The human-machine interface 110 is formed by a combination of a microphone 111 as telephone transmitter, a speaker 112 as telephone receiver, a keypad 113, and a display 114 such as a liquid-crystal display (LCD). A voice signal inputted through the microphone 111 is processed by an audio circuit 115 and enters the control section 140. The keypad 113 is used for the user to input data such as a destination phone number and various instructions such as transmission of a phone number desired by the other party, registration of a new phone number, retrieval of a registered telephone number and the likes. Here, the keypad 113 includes a so-called command navigation button. Necessary information is displayed on the display 114 under control of the control section 140.

The memory 120 includes a phone directory memory 121 and a received data memory 122. The phone directory memory 121 retrievably stores a plurality of entries each including a name, a phone number, and other related information. The received data memory 122 stores received data such as a phone number received from the other party. The received data memory 122 preferably has a capacity for the order of 10 to 20 phone numbers.

The transmitter/receiver section 130 includes an antenna 131, a radio system 132, and a modulator/demodulator (MODEM) 133. The radio system 132 transmits and receives a radio signal to and from a radio base station (not shown) through the antenna 131. The MODEM 133 performs modulation of transmission data input from the control section 140 to output a transmission signal to the radio system 132 and performs demodulation of a received signal input from the radio system to output received data to the control section 140.

The control section 140 includes a program-controlled processor such as a central processing unit (CPU). A control program for the mobile telephone 100 is stored in a read-only memory (not shown) and runs on the processor to control all operations of the mobile telephone including a calling control and a phone number transmission/reception control as described later.

Transmission Control of Phone Number

A phone number transmission control of a mobile telephone 100 according to the first embodiment will be described referring to FIGS. 2 and 3.

Figure 2:
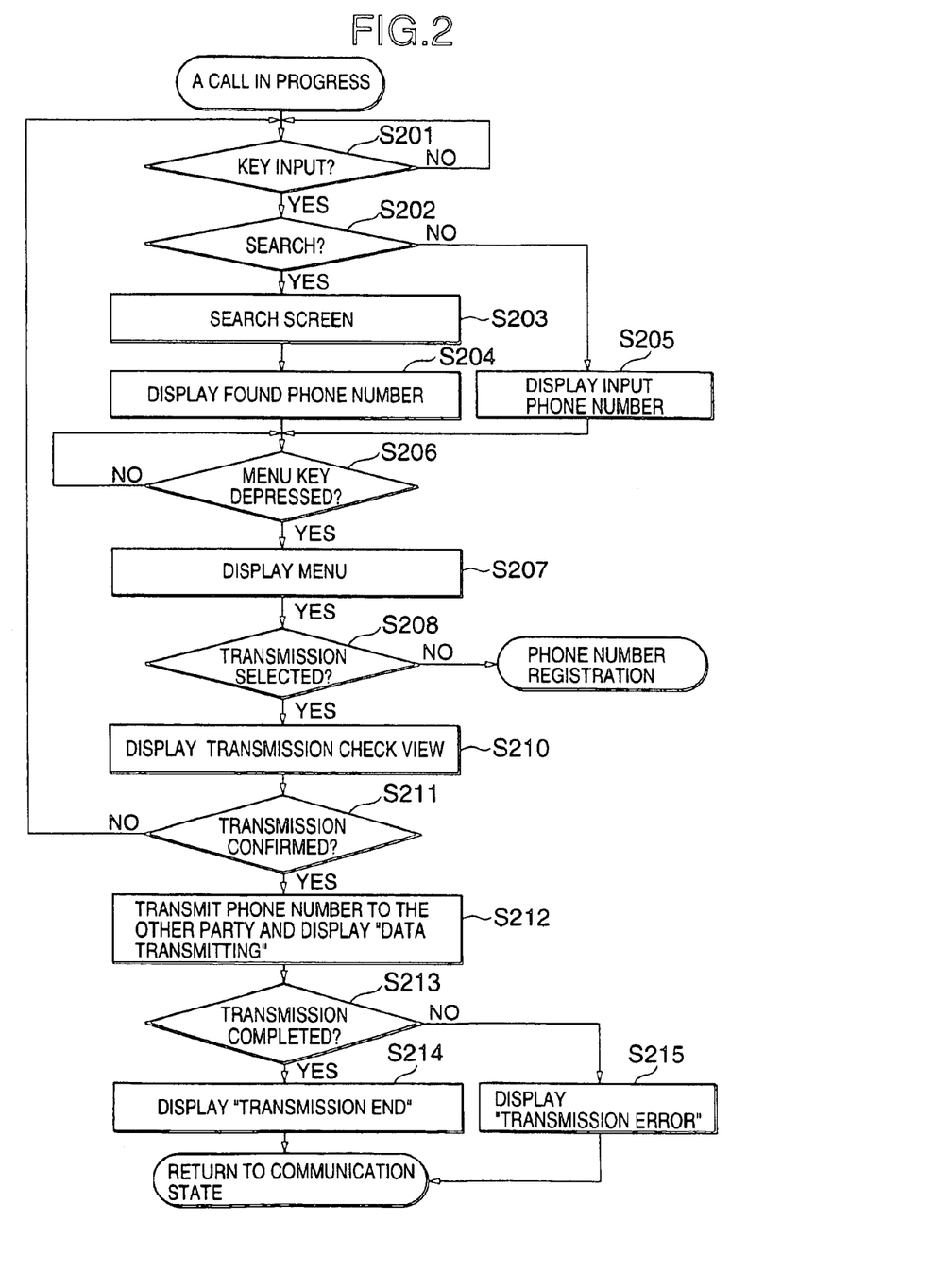
FIG. 2 is a flow chart showing a phone number transmission operation in the first embodiment.

As shown in FIG. 2, it is assumed that a telephone call is in progress through a connection established between two parties each having the mobile telephone 100 having the phone number transmission/reception function, and further that, at the request of the other party, one party transmits the phone number of a third party to the other party through the established connection. When a call is in progress, an in-communication indicating view D301 as shown in FIG. 3 is displayed on the display 114.

Referring to FIG. 2, the control section 140 determines whether the keypad 113 is operated (step S201). When the keypad 113 is operated (YES at step S201), the control section 140 determines whether the key operation is a request of searching the phone directory memory 121 or a phone number input by the user (step S202).

If the key operation is a request of searching the phone directory memory 121 (YES at step S202), the control section 140 starts searching the phone directory memory 121 for an input key word such as a name and outputs search screen data to the display 114 to notify the user that searching is now performed (step S203).

When a match is found in the phone director memory 121, the control section 140 reads out the found phone number from the phone directory memory 121 and outputs it to the display 114 (step S204). In this way, the phone number is displayed together with the corresponding name "A" and other related information on the display 114 as shown in D302 of FIG. 3.

On the other hand, when the key operation is a phone number input by the user (NO at step S202) or when the desired phone number has never been registered in the phone directory memory 121, the control section 140 outputs the input phone number to the display 114 (step S205). In this way, the phone number input by the user is displayed on the display 114 as shown in D303 of FIG. 3.

Figure 3:
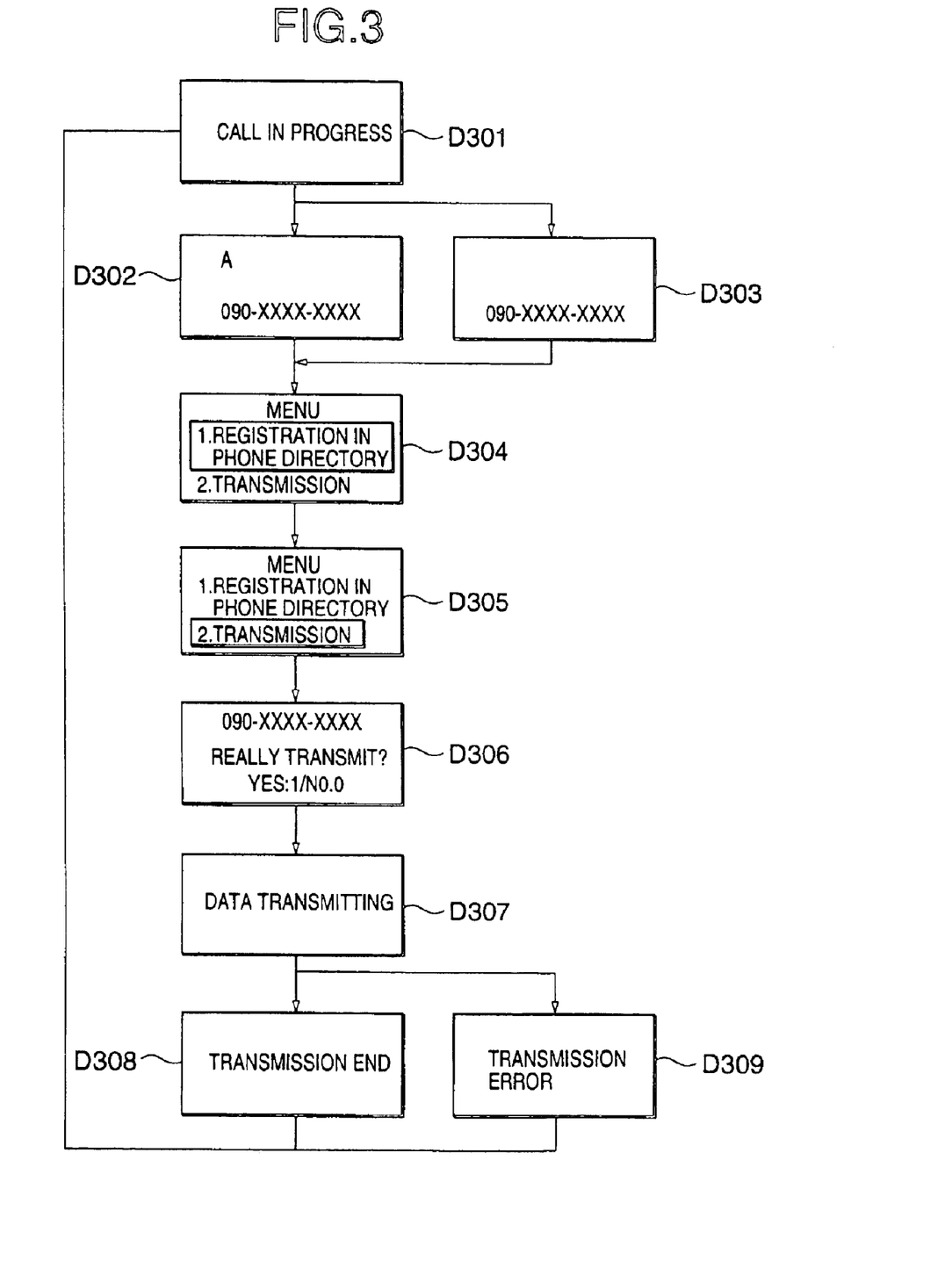
FIG. 3 is a schematic diagram showing a sequence of views displayed according to the phone number transmission operation of FIG. 2.

In such a state that the phone number is displayed on the display 114, when a menu key of the keypad 113 is depressed (YES at step S206), the control section 140 outputs a menu view to the display 114 (step S207) and thereby a menu is displayed on the display 114 (D304 of FIG. 3). Here, the menu has two menu items: Registration in phone directory memory: and Transmission.

When the user selects the registration in phone directory memory (NO at step S208), the control section 140 starts a predetermined registration operation of the input phone number. When the user shifts the highlighted portion to the transmission and enters the transmission as shown in D305 of FIG. 3 (YES at step S208), the control section 140 outputs a transmission check view to the display 114 (step S210) to inquire whether the displayed phone number is really transmitted to the other party (D306 of FIG. 3).

If the user selects "YES" in the transmission check view, then the control section 140 outputs transmission data composed of a predetermined identifier code followed by the phone number to the transmitter/receiver section 130 and thereby the transmission data including the phone number is transmitted to the mobile telephone 100 of the other party. The predetermined identifier code indicates that the following data is the phone number (see FIG. 8). Further, the control section 140 outputs a transmission view to the display 114 (step S212) to display "data transmitting" on the display 114 (D307 of FIG. 3).

When the transmission of the phone number has been successfully completed (YES at step S213), the control section 140 outputs a transmission completion view to the display 114 (step S214) to display "Transmission End" on the display 114 (D308 of FIG. 3). On the other hand, when the transmission of the phone number fails (NO at step S213), the control section 140 outputs a transmission error view to the display 114 (step S215) to display "Transmission Error" on the display 114 (D309 of FIG. 3). Thereafter, the control goes back to the in-communication state where the call is in progress between the parties (D301 of FIG. 3).

Reception Control of Phone Number

A phone number reception control of a mobile telephone 100 according to the first embodiment will be described referring to FIGS. 4 and 5.

Figure 4:
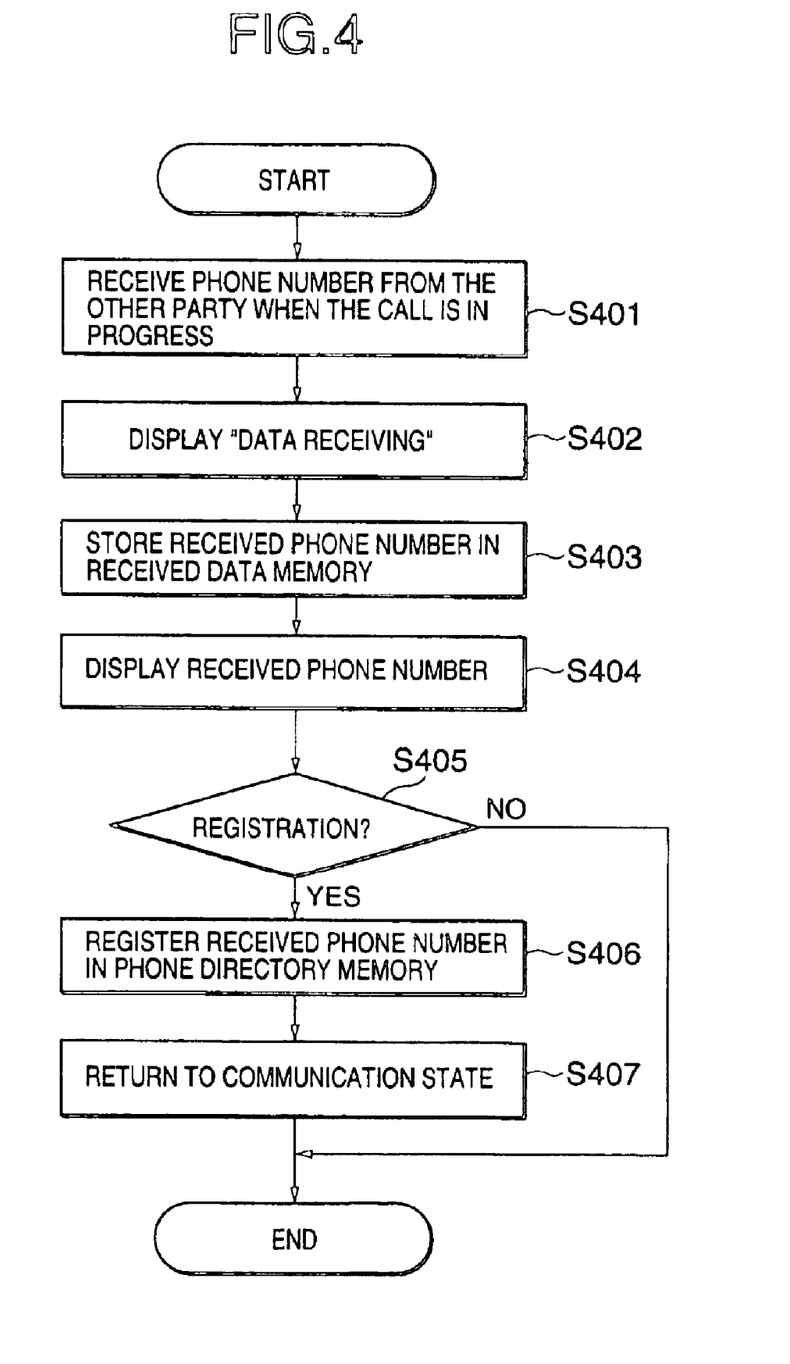
FIG. 4 is a flow chart showing a phone number reception operation in the first embodiment.

As shown in FIG. 4, it is assumed that a telephone call is in progress between two parties each having the mobile telephone 100 and further that one party receives the transmission data composed of a predetermined identifier code followed by the phone number from the other party. When a call is in progress, an in-communication indicating view D301 is displayed on the display 114 as shown in FIG. 3.

Figure 5:
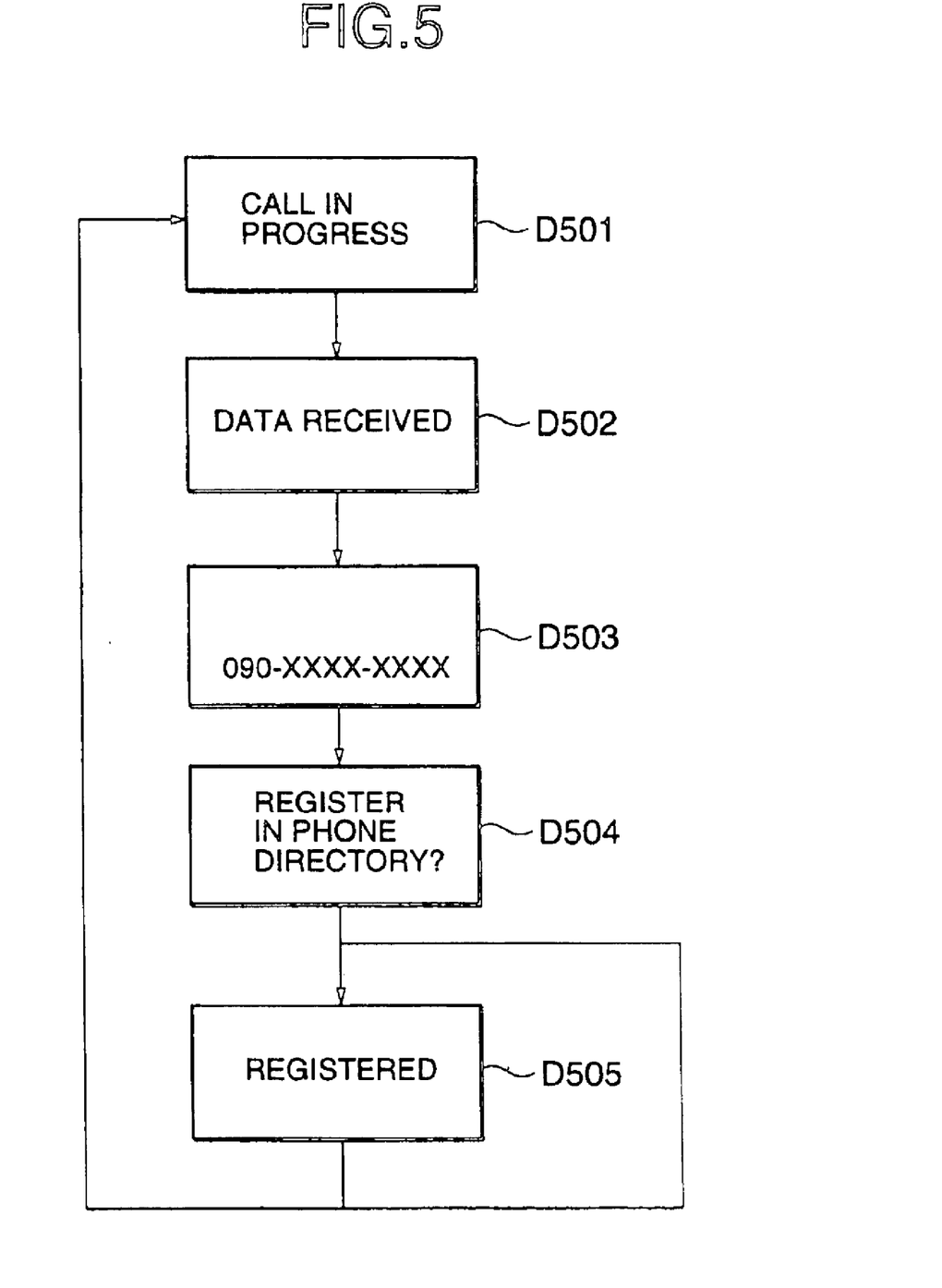
FIG. 5 is a schematic diagram showing a sequence of views displayed according to the phone number reception operation of FIG. 4.

Referring to FIG. 4, when the control section 140 of the mobile terminal 100 detects the predetermined identifier code from the transmission data received from the other party in communication as shown in D501 of FIG. 5 (step S401), the control section 140 outputs a data reception screen to the display 114 (step S402). When the phone number data following the predetermined identifier code has been received, the control section 140 displays "Data received" on the display 114 (D502 of FIG. 5), stores the received phone number to the received data memory 122 (step S403), and outputs the received phone number data to the display 114 (step S404) to display the phone number on display 114 (D503 of FIG. 5).

Thereafter, the control section 140 outputs a registration check view to the display 114 to display "Register in phone directory?" on the display 114 (D504 of FIG. 5) and prompts the user to enter (step S405).

When the user selects the registration of the received phone number (YES at step S405), the control section 140 stores the received phone number to the phone directory memory 121 (step S406) and then returns to the in-communication state (step S407). When the registration has been completed, "Registered" is displayed on the display 114 (D505 of FIG. 5) and, when having returned to the in-communication state, the view of the display 114 is changed into "Call in progress" (D501 of FIG. 5).

When the user does not select the registration of the received phone number (NO at stop S405), the received phone number is left as it is in the received data memory 122. In this case, the user can call up the phone number from the received data memory 122 by operating the keypad 113 so that the phone number is displayed on the display 114. Then, the user can make a call at the phone number.

After registering the phone number received from the other party in the phone directory memory 121, the user can also call up the phone number from the phone directory memory 121 and then make a call at the number by operating the keypad 113.

Second Embodiment

Figure 6:
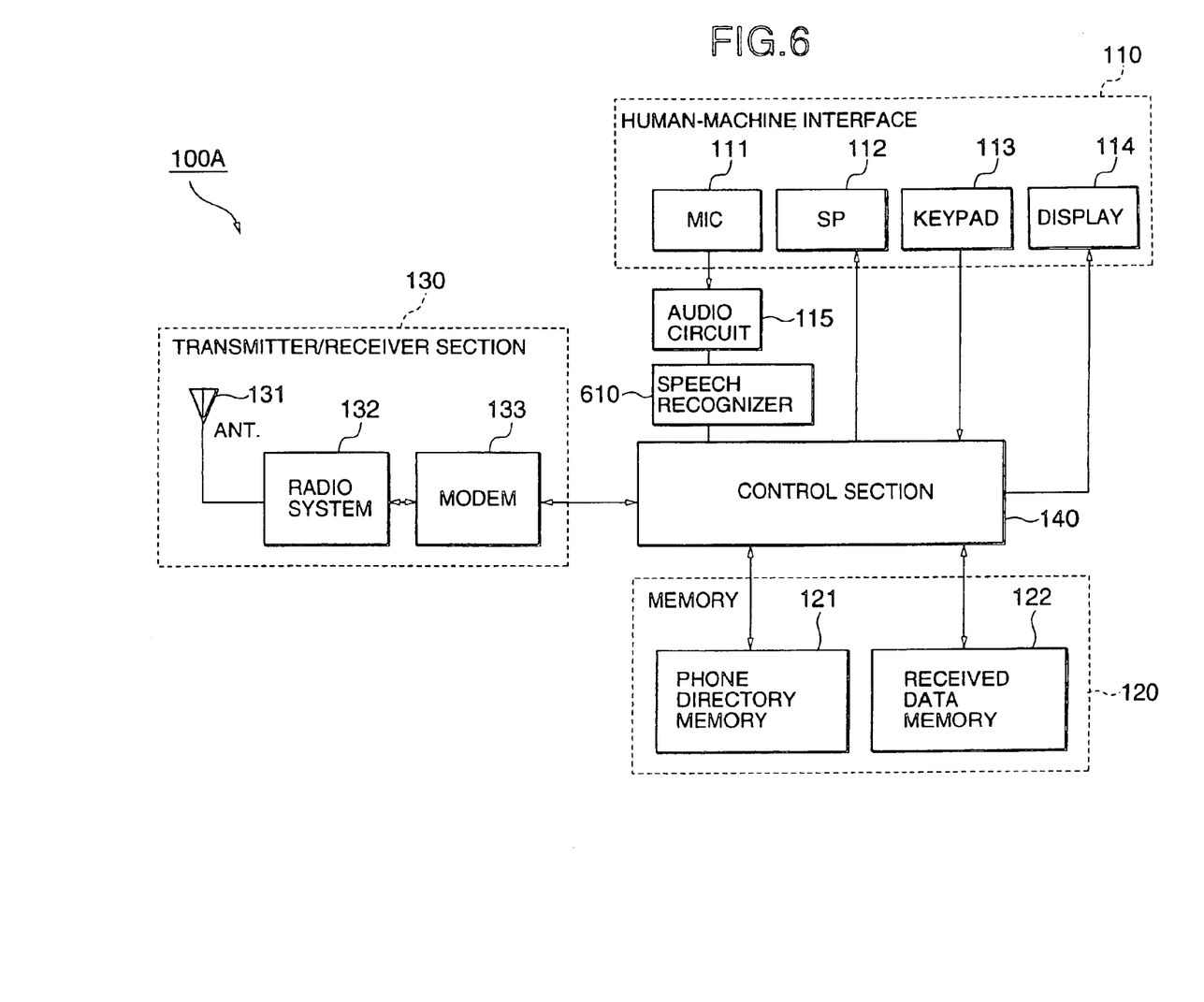
FIG. 6 is a block diagram showing a radio mobile telephone according to a second embodiment of the present invention.

Referring to FIG. 6, there is shown a mobile telephone 100A in accordance with a second embodiment of the present invention. The mobile telephone 100A has the almost same circuit configuration as the first embodiment except for a speech recognizer 610. Therefore, circuit blocks similar to those described with reference to FIG. 1 are denoted by the same reference numerals and the details thereof are omitted.

The speech recognizer 610 recognized a voice signal inputted from the audio circuit 115 to produce character data corresponding to the input voice information (here, digits of a phone number to be transmitted). Accordingly, a desired phone number can be entered by voice input without operating the keypad 113. The phone number transmission control will be described in detail referring to FIG. 7.

Figure 7:
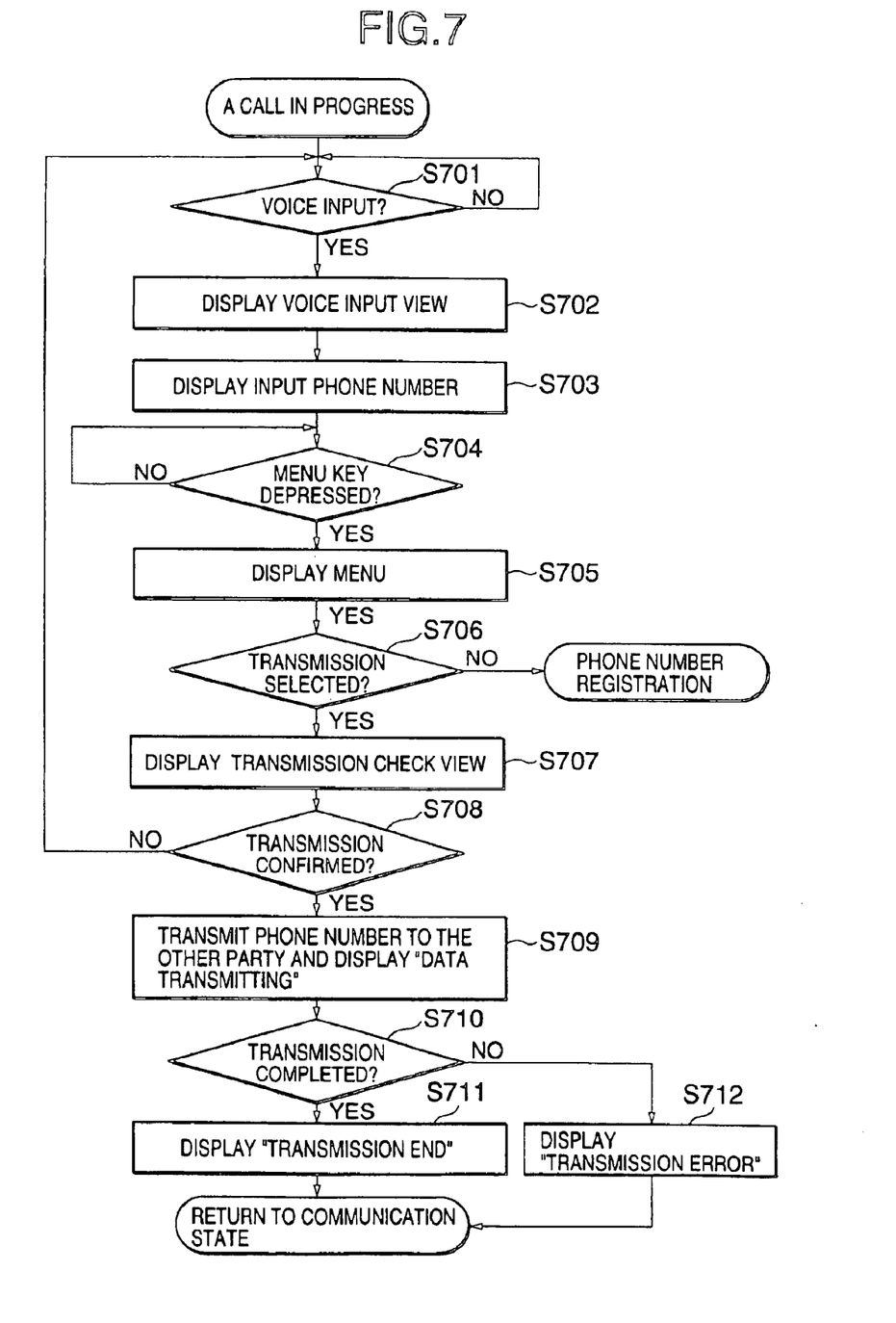
FIG. 7 is a flow chart showing a phone number transmission operation in the second embodiment.

As shown in FIG. 7, it is assumed that a telephone call is in progress between two parties each having the mobile telephone 100A having the phone number transmission/reception function and further that, at the request of the other party, one party transmits the phone number of a third party to the other party.

The control section 140 determines whether voice input occurs (step S701). When voice input occurs (YES at step S701), the control section 140 outputs voice input view data to the display 114 (step S702) and then outputs the recognized phone number data received from the speech recognizer 610 to the display 114 (step S703). In this way, the phone number input by the user is displayed on the display 114 as shown in D303 of FIG. 3.

Thereafter, when a menu key of the keypad 113 is depressed (YES at step S704), the control section 140 outputs a menu view to the display 114 (step S705). When the user selects the registration in phone direction memory (NO at step S706), the control section 140 starts a predetermined registration operation of the input phone number. When the user shifts the highlighted portion to the transmission and enters the transmission (YES at step S706), the control section 140 outputs a transmission check view to the display 114 (step S707) to inquire whether the displayed phone number is really transmitted to the other party.

If the user selects "YES" in the transmission check view (YES at step S708), then the control section 140 outputs transmission data composed of a predetermined identifier code followed by the phone number to the transmitter/receiver section 130 and thereby the transmission data including the phone number is transmitted to the mobile telephone 100 of the other party (step S709). Further, the control section 140 outputs a transmission view to the display 114 to display "data-transmitting" on the display 114.

When the transmission of the phone number has been successfully completed (YES at step S710), the control section 140 outputs a transmission completion view to the display 114 (step S711). On the other hand, when the transmission of the phone number fails (NO at step S710), the control section 140 outputs a transmission error view to the display 114 (step S712). Thereafter, the control goes back to the in-communication state where the call is in progress between the parties.

Figure 8:
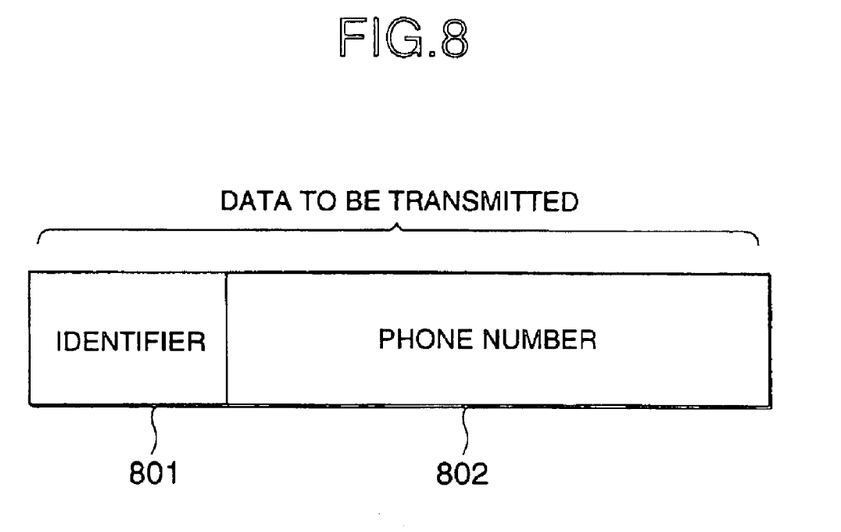
FIG. 8 is a diagram showing a data format of data including a phone number to be transmitted.

As shown in FIG. 8, data to be transmitted during conversation has a predetermined format such that a predetermined identifier code field 801 followed by a phone number data field 802. In the embodiments, the identifier code field 801 and the phone number data field 802 have predetermined bit lengths, respectively. In other words, when detecting the predetermined identifier code from received data, the control section 140 can read a predetermined number of bits following the predetermined identifier code as phone number data to discriminate the phone number data from other data.

The predetermined identifier code may be added to the phone number data when the user enters the transmission (YES at steps S208 of FIG. 2 and S706 of FIG. 7).

What is claimed is:

1. A method for transmitting data from a first telephone to a second telephone during an established audio connection between the telephones, the method comprising:

at the first telephone, a) producing data to be transmitted comprising a first data field that includes a predetermined identifier code, the predetermined identifier code indicating that a second data field that includes a telephone number will follow the first data field;

b) transmitting the data to the second telephone through the connection during the established audio connection;

at the second telephone,
   c) receiving the first data field and the second data field;
   d) displaying the telephone number; and
   e) storing the telephone number into a memory for storing data.

2. The method according to claim 1, further comprising:
   f) at the second telephone, making a call to the telephone number stored in the memory as a function of a user's instruction.

3. The method according to claim 1, wherein in the step (a), the telephone number is produced through an input device.

4. The method according to claim 1, wherein in the step (a), the telephone number is retrieved from the memory depending on a user's instruction.

5. The method according to claim 1, wherein in the step (a), a processor performs speech recognition to produce the second data field.

6. A telephone adapted to permit a telephone conversation between a first user associated with the telephone and a second user associated with a remote telephone when an audio connection has been established between the two telephones, said telephone comprising:
   a transceiver;
   a display device;
   an input device for inputting instructions;
   a memory for storing data; and
   a processor for controlling telephone operations;
   wherein the telephone, responsive to the processor, is capable of transmitting information data other than conversation data through the established audio connection, the information data comprising a first data field that includes a predetermined identifier code, the predetermined identifier code indicating that a second data field that includes a telephone number will follow the first data field.

7. The telephone according to claim 6, wherein the telephone number transmitted in the second data field is produced in response to an instruction inputted through the input device.

8. The telephone according to claim 6, wherein the telephone number transmitted is obtained from the memory.

9. The telephone according to claim 6, further comprising:
   a speech recognizer, responsive to the processor, for recognizing input voice signals to produce character data;
   wherein the phone number to be transmitted is produced by the speech recognizer upon receiving the voice signals corresponding to the digits of the telephone number through a microphone of the telephone.

10. A telephone adapted to permit a telephone conversation between a first user associated with the telephone and a second user associated with a remote telephone when an audio connection has been established between the two telephones, said telephone comprising:
    a transceiver;
    a display device;
    an input device for inputting instructions;
    a memory for storing data; and
    a processor controlling telephone operations;
    wherein the telephone, responsive to the processor, is capable of receiving information data other than conversation data through the established audio connection, the information data comprising a first data field that includes a predetermined identifier code, the predetermined identifier code indicating that a second data field that includes a telephone number will follow the first data field.

11. The telephone according to claim 10, wherein the processor causes the telephone number to be displayed to the display device.

12. The telephone according to claim 10, wherein the telephone is capable of making a telephone call to the telephone number upon an instruction inputted into the input device.

13. The telephone according to claim 10, wherein the processor causes the telephone number to be stored into the memory.

14. The telephone according to claim 13, wherein the memory is a received data memory.

15. The telephone according to claim 13, wherein the memory is a phone directory memory.

16. A communications link between a sending telephone and a receiving telephone, wherein during a telephone call the ink is adapted to permit the transfer of information data comprising a first data field that includes a predetermined identifier code, the predetermined identifier code indicating that a second data field that includes a telephone number will follow the first data field.

* * * * *